United States Patent
Choi

(10) Patent No.: US 7,206,616 B2
(45) Date of Patent: Apr. 17, 2007

(54) HANDPHONE CAPABLE OF INPUTTING CHARACTERS LIKE KEYBOARD

(75) Inventor: Hyun-seok Choi, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 506 days.

(21) Appl. No.: 10/349,186

(22) Filed: Jan. 23, 2003

(65) Prior Publication Data

US 2003/0153371 A1 Aug. 14, 2003

(30) Foreign Application Priority Data

Jan. 23, 2002 (KR) .............................. 2002-3857
Aug. 13, 2002 (KR) .............................. 2002-47896

(51) Int. Cl.
*H04B 1/38* (2006.01)

(52) U.S. Cl. .............. 455/575; 455/90.3; 455/566; 455/575.3; 379/433.04; 379/433.07; 379/433.13; 341/22; 345/168; 361/680; 361/681

(58) Field of Classification Search ............ 455/550, 455/566, 90.3, 550.1, 575.1, 575.3, 575.4, 455/575.8; 379/428.01, 428.02, 428.03, 379/428.04, 431, 433.01, 433.04, 433.07, 379/433.12; 341/22; 345/168; 361/679, 361/680, 681
See application file for complete search history.

(56) References Cited

U.S. PATENT DOCUMENTS

| | | | |
|---|---|---|---|
| 6,798,882 B2* | 9/2004 | Kupiainen | 379/433.04 |
| 6,952,200 B2* | 10/2005 | Sirola et al. | 345/168 |
| 2001/0035858 A1* | 11/2001 | Blumberg | 345/168 |
| 2002/0034063 A1* | 3/2002 | Miller, Jr. | 361/680 |
| 2003/0078014 A1* | 4/2003 | Salminen et al. | 455/90 |
| 2003/0078069 A1* | 4/2003 | Lindeman | 455/550 |
| 2005/0110753 A1* | 5/2005 | Ahn et al. | 345/158 |

FOREIGN PATENT DOCUMENTS

EP 0 933 908 A2 8/1999

* cited by examiner

*Primary Examiner*—Binh K. Tieu
(74) *Attorney, Agent, or Firm*—Sughrue Mion, PLLC

(57) ABSTRACT

A handphone including a phone body and a cover and which is capable of inputting characters using both a keypad installed on the phone body and an extra keypad installed on the cover in the manner in which characters are input through a computer keyboard. The phone body has a display device and a keypad including a plurality of keys. The cover covers the phone body and includes a second keypad including a plurality of keys. The first and second keypads are functionally coupled together to input characters. The handphone has a keyboard structure, such as a computer keyboard, formed by functionally coupling the auxiliary keypad of the cover to the keypad of the phone body. In this structure, characters can be input similar to the way that characters are input through a computer keyboard, so that significantly faster character input is possible.

1 Claim, 7 Drawing Sheets

EYE DIRECTION

DIRECTION IN WHICH COVER IS UNFOLDED

HANDPHONE CAPABLE OF INPUTTING CHARACTERS LIKE KEYBOARD

BACKGROUND OF THE INVENTION

1. Field of the Invention

The present invention relates to the field of handphones and, more particularly, to a handphone capable of inputting characters like a computer keyboard by installing a keypad on the phone body and also installing an extra keypad on the phone cover.

The present application is based on Korean Application Nos. 2002-3857, filed Jan. 23, 2002, and 2002-47896, filed Aug. 13, 2002, and both of which are incorporated herein by reference.

2. Description of the Related Art

Various handphone terminals (hereinafter, referred to as handphones) using a radio communications network are being introduced with the development of information communications. Handphones are being rapidly used thanks to the convenience of its use that users can make calls freely regardless of the location. A wireless Internet service, a combination of a handphone and an Internet service, is recently being used. In addition, a short message service (SMS) or an e-mail service is carried out through handphones.

As for handphones, an increase in the importance of the character input function leads to an increase in the size of a liquid crystal display (LCD). In the early stage, LCD devices only could display 2 to 3 lines with the 7-segment system, while more recently used LCD devices can display 5 lines with the dot matrix system.

However, an input mechanism for inputting character messages to a handphone has not caught up with the rapidly increasing demand and use of character information transmission.

Handphones have a significant difficulty in sending and receiving a sufficient amount of character information, because of the restriction that handphones should be kept light and small. That is, as handphones should be small enough to fit easily into the palm of a hand, their keypads can only have a basic structure in which the size of the keyboard or the number of keys is limited, so that only the minimum amount of information can be input. That is, current handphones have a normal telephone keypad composed of 10 numeric keys and 5 function keys.

As the search and input of information requested by users are considerably limited, a method for rapid, accurate character input is needed in order to actively use a wireless Internet service using handphones.

There are proposed various types of wire and wireless keyboards that enable users to easily input a desired message by connecting the keyboard to a handphone as needed while carrying. However, these keyboards are to be carried in addition to a handphone and to be coupled to a handphone to be used.

SUMMARY OF THE INVENTION

To solve the above-described problems, it is an aspect of the present invention to provide an enhanced handphone capable of rapid and accurate character input.

An apparatus consistent with the present invention relates to a handphone including a phone body having a display device and a first keypad including a plurality of keys, and a cover for covering the phone body. In this structure, the cover has a second keypad including a plurality of keys, and the first and second keypads are functionally coupled together to be operative to input characters.

Preferably, the handphone displays 90°-rotated characters on the LCD when the characters are input using both the first keypad of the phone body and the second keypad of the phone cover. This enables people to easily identify displayed characters.

The present invention further provides a portable phone terminal including a phone housing having a liquid crystal display (LCD) and a first keypad including a plurality of keys, a cover for covering the phone housing, and a second keypad including a plurality of keys installed on an inner side of the cover and functionally coupled to the first keypad. Accordingly, a keyboard structure similar to a computer keyboard is established by the second keypad coupling to the first keypad when the cover is opened.

BRIEF DESCRIPTION OF THE DRAWINGS

The above aspects and advantages of the present invention will become more apparent by describing in detail illustrative, non-limiting embodiments thereof with reference to the attached drawings, in which.

DETAILED DESCRIPTION OF THE INVENTION

A handphone according to illustrative, non-limiting embodiments of the present invention provides a keypad structure like a computer keyboard by functionally coupling an auxiliary keypad installed on the cover to a keypad installed on the body. Accordingly, users can input characters in a manner similar to the action of tapping on a computer keyboard, so that the handphone according to the present invention can significantly increase the rapidity of inputting characters.

In addition, when characters are input using both the keypad of the phone body and the auxiliary keypad of the phone cover, the handphone according to the present invention displays 90°-rotated characters on a display device. This enables people to easily identify displayed characters.

Figure 1:
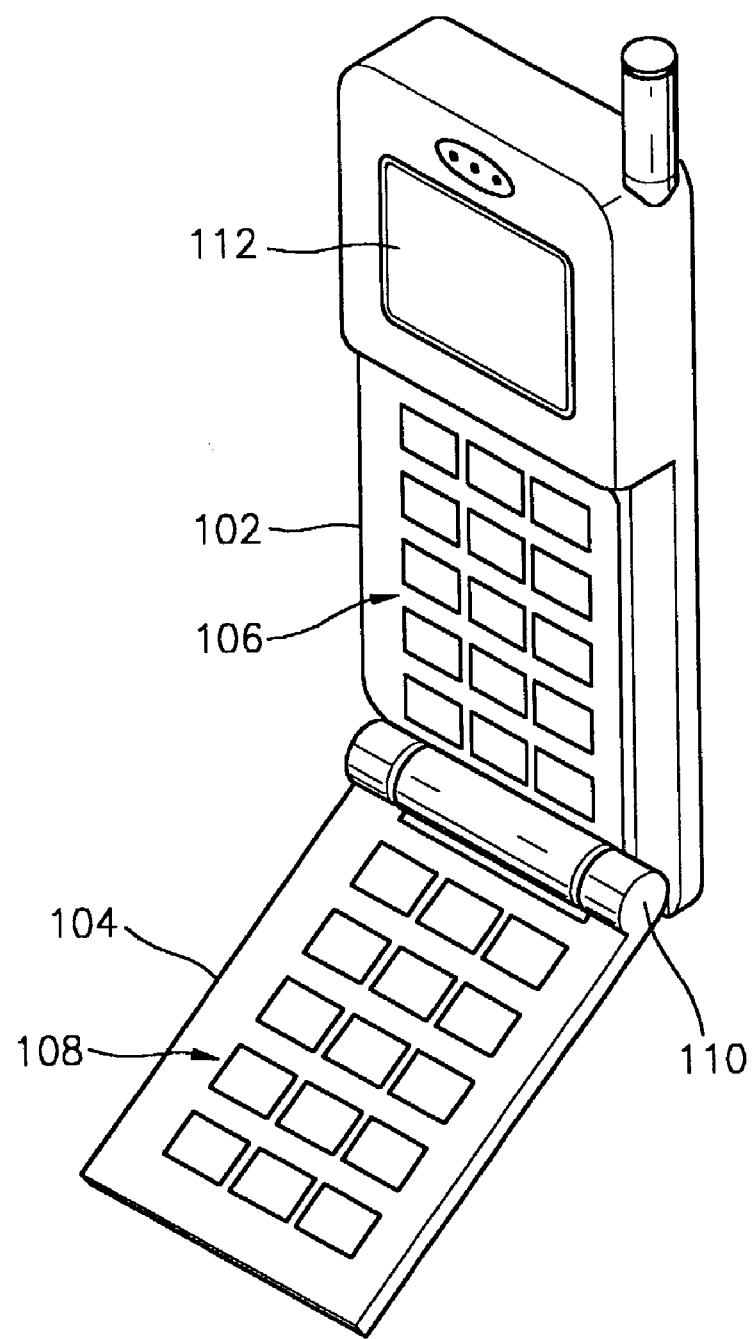
FIG. 1 is a perspective view showing the outside appearance of a handphone according to an embodiment of the present invention, the embodiment applied to a flip-style handphone.

FIG. 1 shows a flip-type handphone according to an embodiment of the present invention. Referring to FIG. 1, a phone body 102 and a cover 104 have respective keypads. The phone body 102 includes a display device such as, for example, a liquid crystal display (hereinafter referred to as LCD) 112 and a first keypad 106. The cover 104 is coupled to the phone body 102 by a hinge mechanism 110.

The first keypad 106, installed on the phone body 102, and a second keypad 108, installed on the cover 104, establishes a keyboard structure similar to a computer keyboard through their functional coupling.

Figure 2:
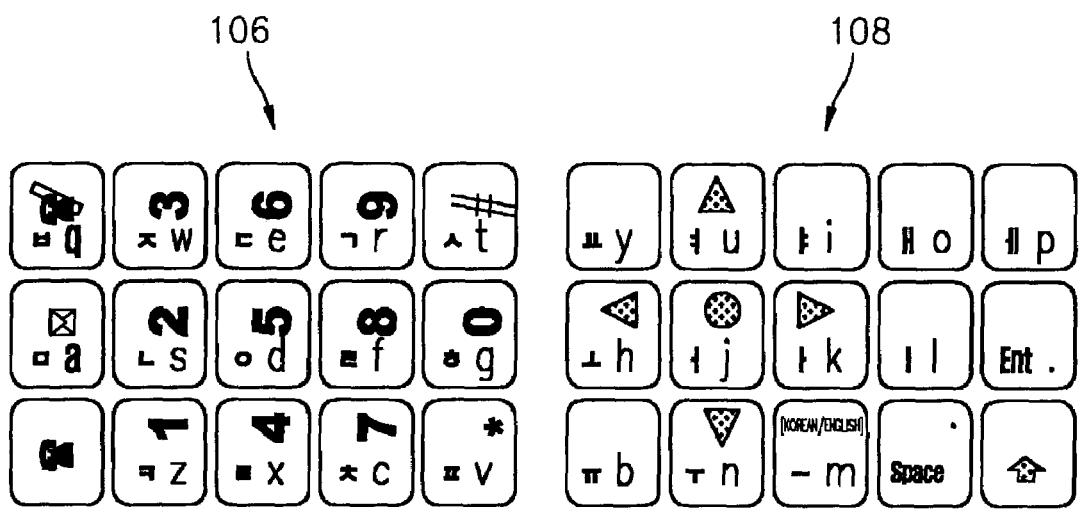
FIG. 2 shows an example of a keypad arrangement on the handphone of FIG. 1.

FIG. 2 shows an example of a keypad arrangement on the handphone of FIG. 1. Referring to FIG. 2, a handphone is rotated by 90° from a normal position upon telephone conversation to the left.

The left side of FIG. 2 shows the first keypad 106 of FIG. 1 in detail, and its right side shows the second keypad 108 of FIG. 1 in detail. As shown in FIG. 2, the first keypad 106 basically has a similar structure to the keypad of a conventional handphone, which has 10 numeric keys, a "*" key, a "#" key and three functional keys (a send key, a mail key and an end key).

In particular, the keys on the first keypad 106 correspond to the phonemes tapped by the left hand on a computer keyboard. For example, two keys in the first column from the left side correspond to "q or ㅂ" and "a and ㄷ". The three keys in the second column from the left side correspond to "w or ㅈ", "s or ㄴ" and "z or ㅋ". The three keys in the third column from the left side correspond to "e or ㄷ", "d or ㅇ", and "x or ㅌ". The three keys in the fourth column from the left side correspond to "r or ㄱ", "f or ㄹ", and "c or ㅊ". The three keys in the last column from the left side correspond to "t or ㅅ", "g or ㅎ", and "v or ㅍ". Here, in each of the aforementioned phoneme pairs, the second one is a consonant of Korean characters.

The second keypad 108 is basically composed of an equal number of keys to the keys of the first keypad 106. The keys on the second keypad 108 correspond to the phonemes tapped by the right hand on a computer keyboard. For example, the three keys in the first column from the right side correspond to "p or ㅖ", "enter" and "shift". The three keys in the second column from the right side correspond to "o or ㅒ", "l or ㅣ" and ". or space". The three keys in the third column from the right side correspond to "i or ㅑ", "k or ㅏ" and "m or ㅡ". The three keys in the fourth column from the right side correspond to "u or ㅕ", "j or ㅓ" and "n or ㅜ". The three keys in the last column from the right side correspond to "y or ㅛ", "h or ㅗ", and "b or ㅠ". Here, in each of the aforementioned phoneme pairs, the second one is a vowel of Korean characters.

That is, the first keypad 106 on the phone body 102 and the second keypad 108 on the cover 104 form a keyboard structure similar to a computer keyboard by their functional coupling. Thus, basically, the handphone of FIG. 1 can accomplish rapid and accurate character input using the aforementioned parallel input system of a computer keyboard.

Numeric input is executed by pressing down a desired numeric key persistently for a predetermined period of time, like a conventional handphone or a telephone keypad. The conversion between Korean and English is achieved by persistently pressing down the last key ("m or —") on the third column from the right side for a predetermined period of time in a manner similar to the numeric input.

The use of a mode for inputting characters using the first keypad 106 of the phone body 102 and the second keypad 108 of the cover 104 depends on a predetermined key on the second keypad 108, for example, an Enter key. To be more specific, when a user inputs desired characters using the first and second keypads 106 and 108 and then depresses the Enter key on the second keypad 108, the phone body 102 recognizes the character input as a mode of inputting characters through both the first and second keypads 106 and 108. To the contrary, in order to cancel the mode of inputting characters through both the first and second keypads 106 and 108, the Enter key must be firmly depressed longer than a predetermined period of time.

In the initial state of the handphone of FIG. 1 where power is applied, or when the handphone of FIG. 1 resumes a conversation, a normal used state is set. When the Enter key on the second keypad 108 installed on the cover 104 is depressed, the mode of inputting characters using both the first and second keypads 106 and 108 is commenced or cancelled depending on the duration of the Enter key input.

Figure 3:
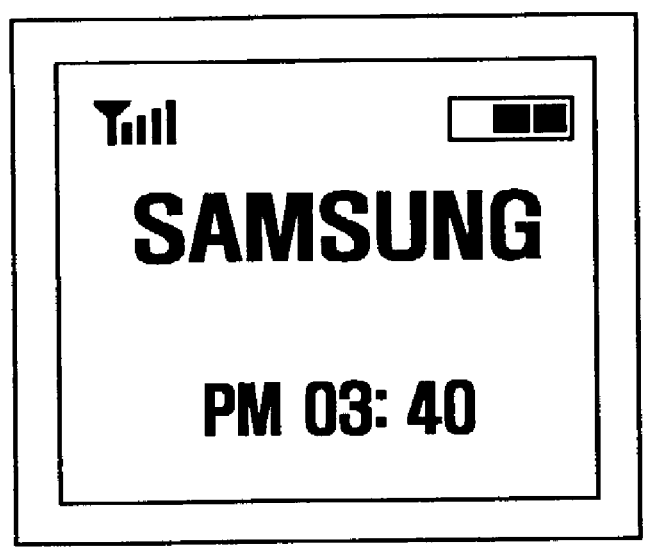
FIG. 3 shows the content displayed on a liquid crystal display (LCD) in a conventional handphone.
Figure 3:
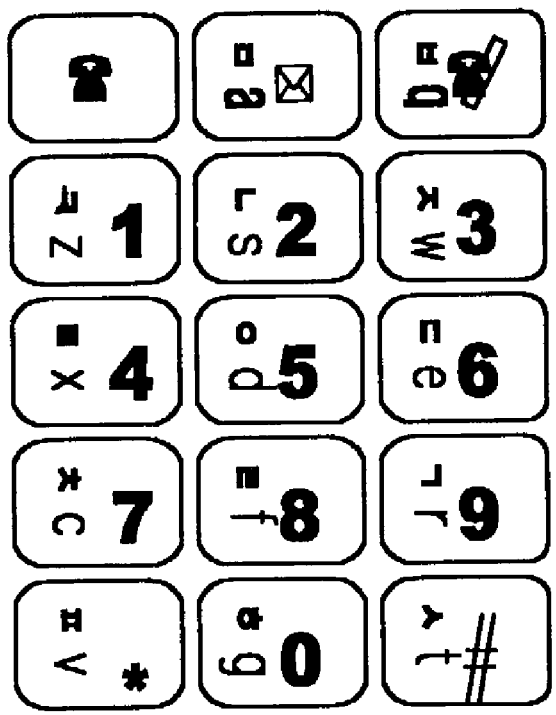
Figure 4:
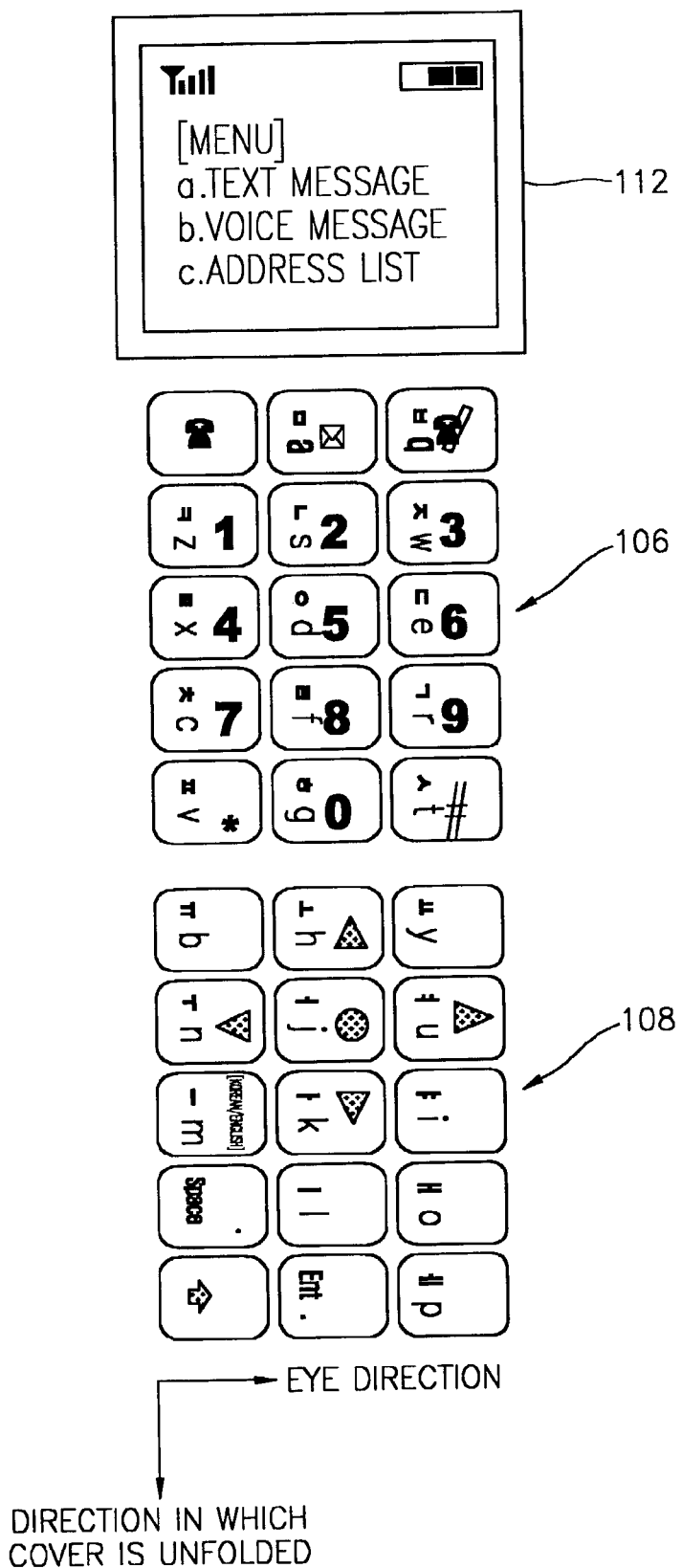
FIG. 4 shows the fact that, although the handphone of FIG. 1 is rotated 90° to enter characters, an LCD 112 displays characters in the same direction as when only a keyboard installed on a phone body is used.

FIG. 3 shows the content displayed on an LCD in a conventional handphone. FIG. 4 shows the fact that, although the handphone of FIG. 1 is rotated 90° to enter characters, an LCD 112 displays characters in the same direction as when only a keyboard installed on a phone body is used.

That is, the LCD in a conventional handphone is designed to display characters from the left side to the right side as shown in FIG. 3. However, when an LCD 112 displays characters like the LCD of the conventional handphone, even though the handphone of FIG. 1 is used rotated 90° from the normal position in order to input characters, characters are displayed in the direction from the bottom to the top on the LCD 112 as shown in FIG. 4. This makes it difficult for users to easily identify entered character information.

Figure 5:
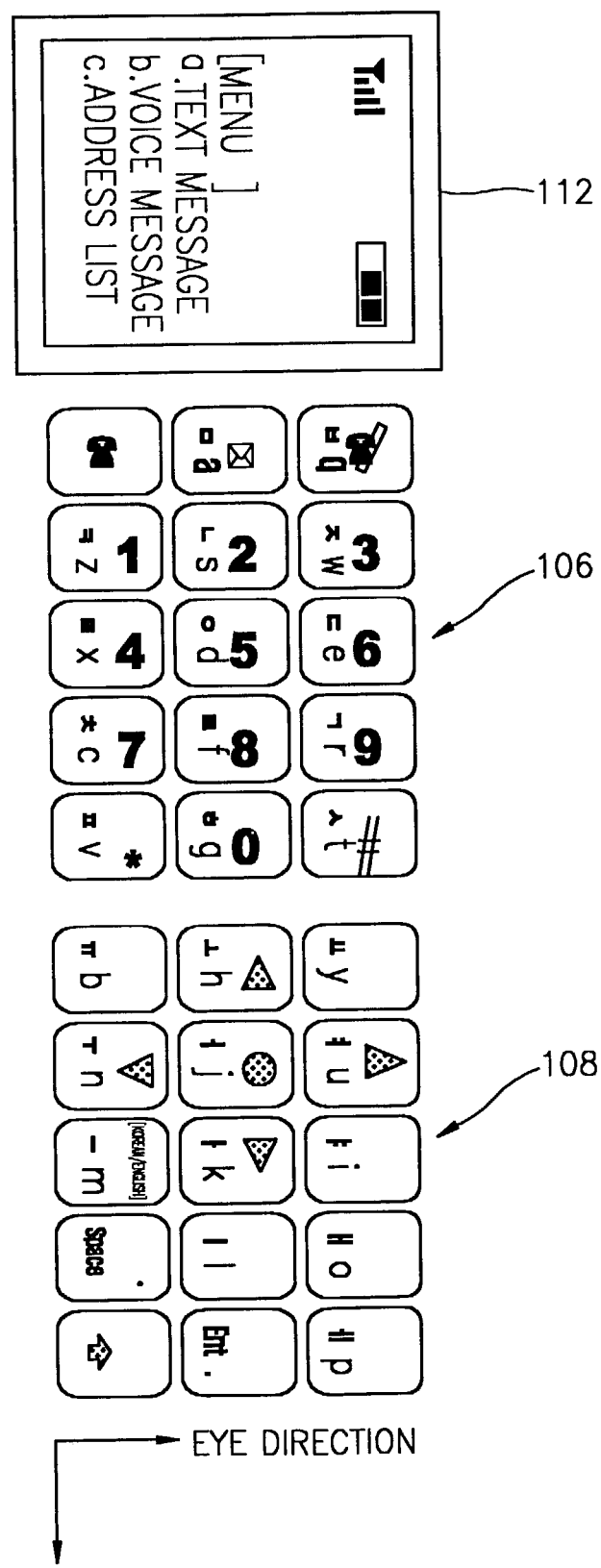
FIG. 5 shows a case in which the handphone of FIG. 1 inputs characters using first and second keypads 106 and 108.

In order to solve this problem, the handphone according to the present invention rotates the content to be displayed on the LCD 112 by 90° to the right from the displayed state of characters input using only the first keypad 106 installed on the phone body 102 (see FIG. 5).

FIG. 5 shows the state of characters displayed on the LCD 112 when the handphone of FIG. 1 is used rotated 90° to enter characters. As shown in FIG. 5, if characters entered through the first and second keypads 106 and 108 by rotating a handphone 90° is displayed rotated 90° to the right direction from the displayed state of characters entered using only the first keyboard 106, entered characters are displayed from the left side to the right side on the LCD 112 to the eyes of a user. That is, the entered characters are displayed parallel to the eye direction of the user, which enables users to easily identify displayed characters.

As shown in FIG. 5, the handphone according to the present invention not only can input characters in such a manner as the inputting method through a computer keyboard but can also easily identify input characters displayed on the LCD 112.

Figure 6:
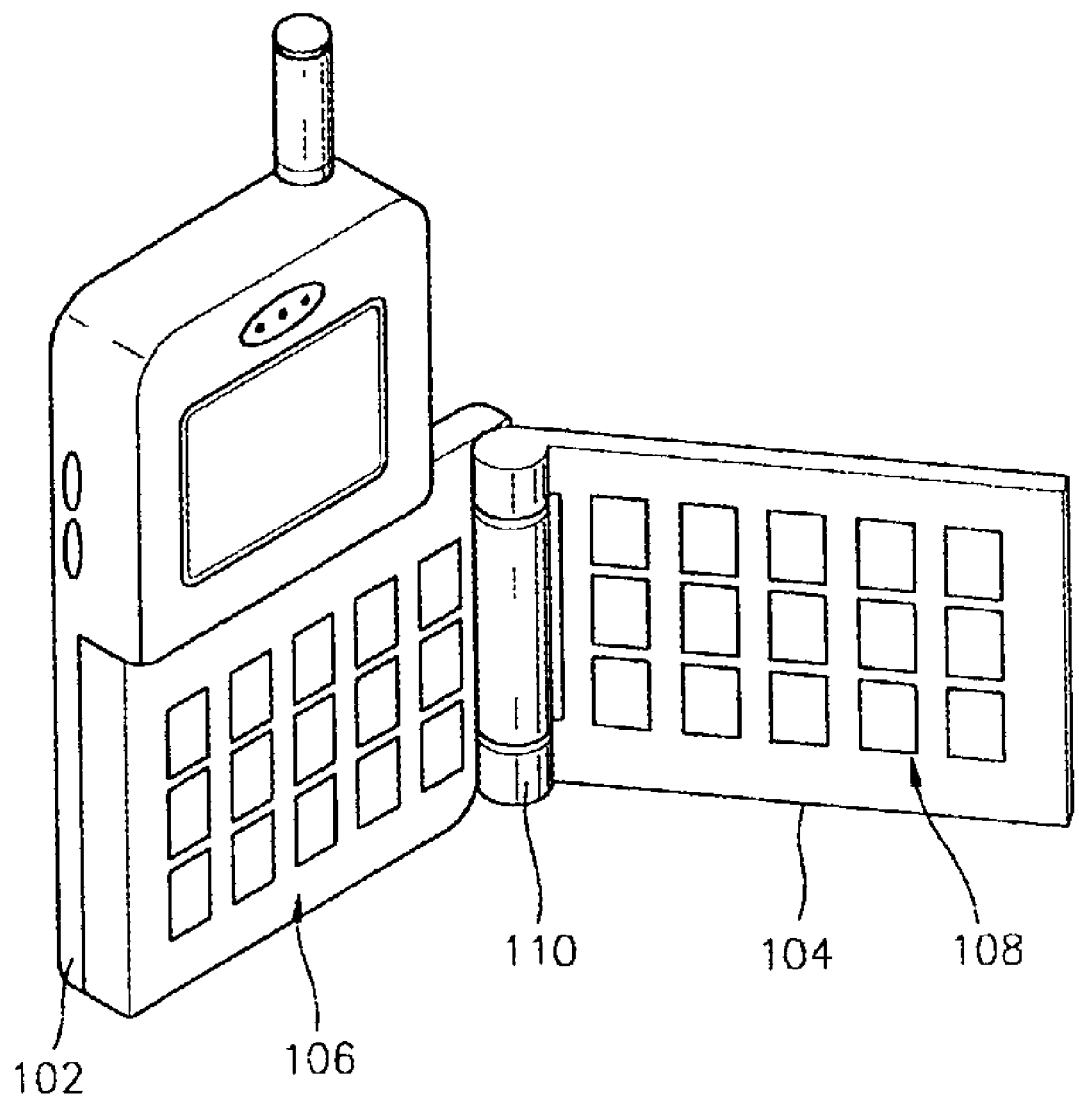
FIG. 6 is a perspective view of a handphone according to another embodiment of the present invention.

FIG. 6 is a perspective view of a handphone according to another embodiment of the present invention. The first keypad 106 installed on the phone body 102 is rotated 90° to the left side as shown in FIG. 6 unlike the embodiment of FIG. 1.

The first and second keypads 106 and 108 are mechanically coupled together by the hinge mechanism 110. Accordingly, users can easily recognize the displayed content.

According to the present invention, a handphone can be designed such that the cover is unfolded down or aside.

Figure 7:
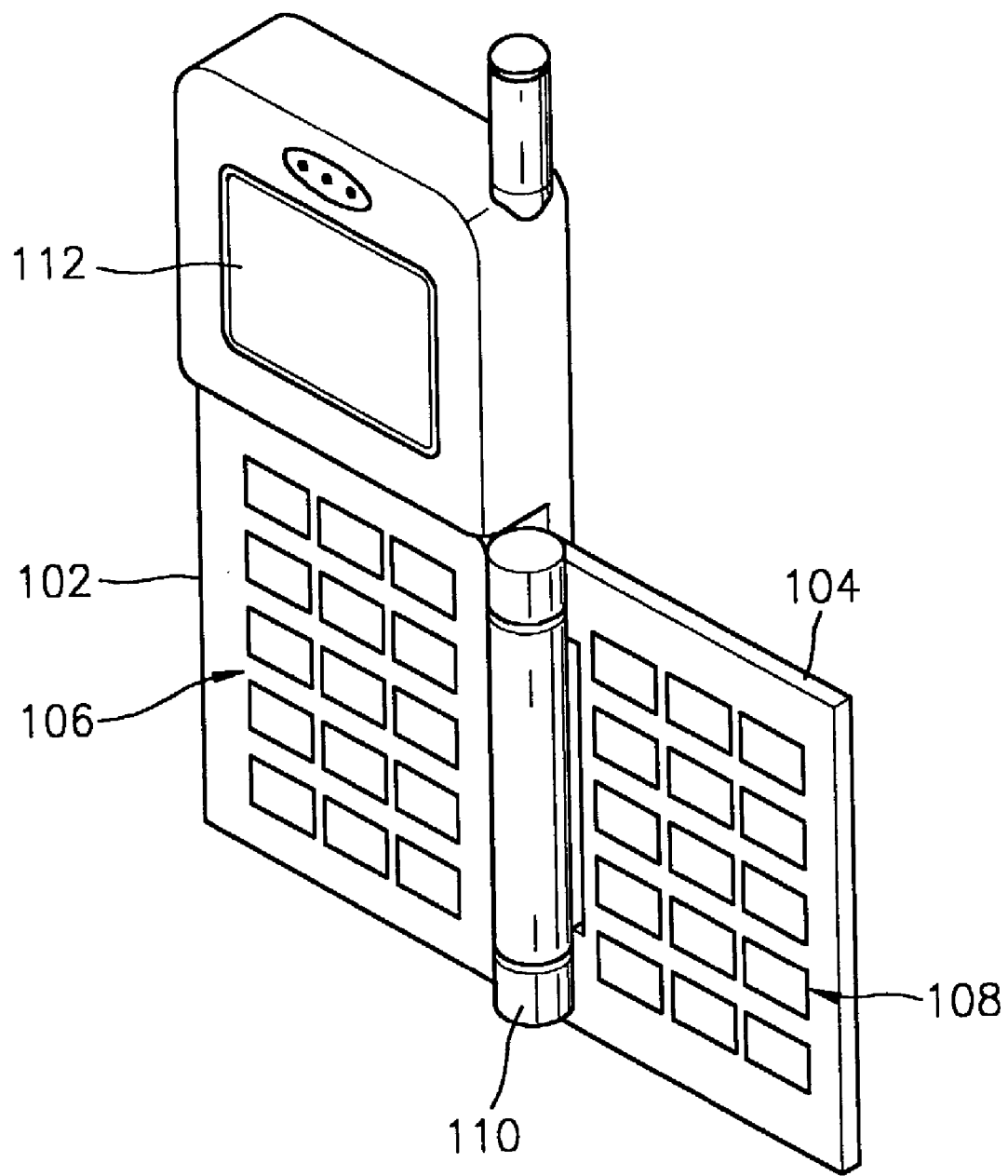
FIG. 7 is a perspective view of a handphone according to still another embodiment of the present invention, in which the cover opens aside.

FIG. 7 is a perspective view of a handphone according to still another embodiment of the present invention, in which the cover opens aside. The handphone of FIG. 7 cannot input characters in exactly the same manner as the inputting manner through a computer keyboard as shown and described in FIG. 2. However, the function of the handphone can be diversified by changing a key inputting manner or giving different functions to the keys installed on the cover.

As described above, the handphone according to the present invention has a keyboard, such as a computer keyboard, which is formed by functionally coupling an auxiliary keypad installed on the cover to the keypad installed on the phone body. In this structure, characters can be input like the way that characters are input through a computer keyboard, so that significantly faster character input is possible.

In addition, the handphone according to the present invention rotates input text content 90° from the normal display state and displays 90°-rotated content on an LCD. Hence, even when users input characters using a handphone rotated 90°, they can easily identify the input characters from the LCD.

The handphone according to the present invention is also designed so that characters can be input by using the handphone alone without an extra keyboard, thus increasing the convenience of the use of handphones.

It is contemplated that numerous modifications may be made to the handphone of the present invention without departing from the spirit and scope of the invention as defined in the following claims.

What is claimed is:

1. A handphone comprising:

a phone body having a display device and a first keypad including a plurality of keys and being rotatably mounted to the phone body; and a cover for covering the phone body, wherein the cover has a second keypad including a plurality of keys, and the first and second keypads are functionally coupled together to be operative to input characters, wherein the first keypad is operative to rotate 90° within a plane parallel to a plane of a face of the display device and to one side with respect to the phone body to a character inputting position, and wherein a mode of inputting characters using both the first keypad and the second keypad is carried out when the first keypad is rotated to the 90° character inputting position.

* * * * *